G. FISHER.
COFFEE ROASTER.
No. 188,119. Patented March 6, 1877.
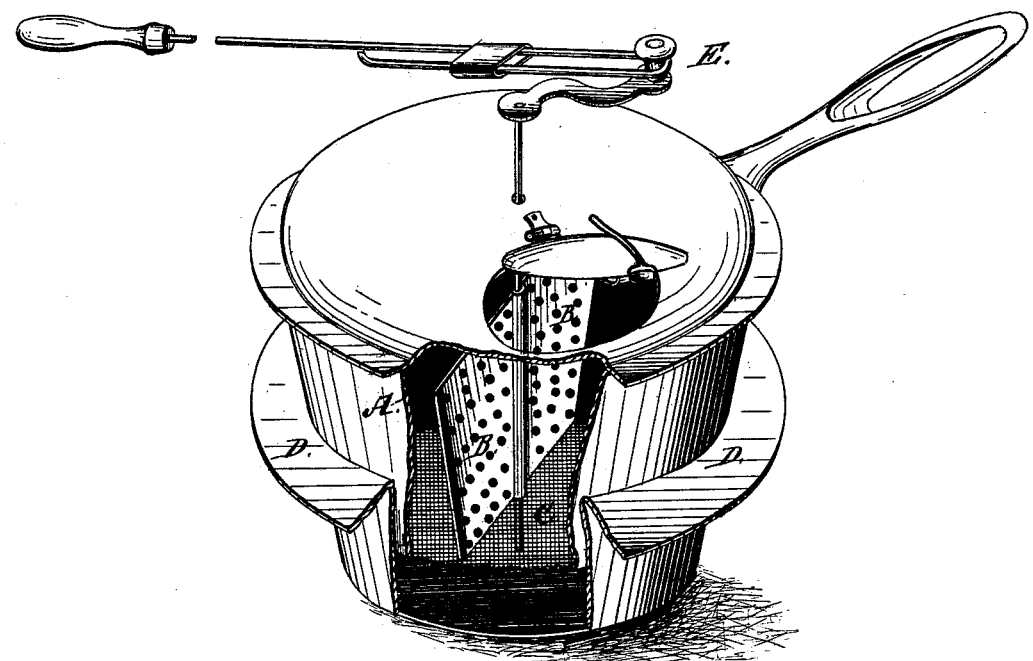
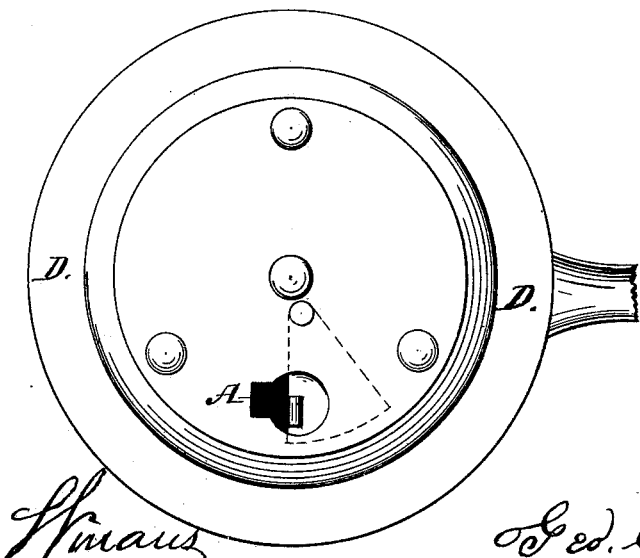
Witnesses:
James Winans
Thomas Dunlap
Inventor:
Geo. Fisher

UNITED STATES PATENT OFFICE.

GEORGE FISHER, OF TOLEDO, OHIO.

IMPROVEMENT IN COFFEE-ROASTERS.

Specification forming part of Letters Patent No. 188,119, dated March 6, 1877; application filed August 3, 1876.

*To all whom it may concern:*

Be it known that I, GEORGE FISHER, of Toledo, in the county of Lucas and State of Ohio, have invented a new and useful Improvement in Coffee-Roasters, of which the following is a specification:

The coffee-roaster is designed for use in the pot-hole of a stove. The receiving-chamber has a fixed top and bottom, and flange to hold it in the pot-hole. A fixed wire bottom divides the chamber near the bottom, and forms a heat and dust chamber at the bottom of the receiver. A vertical crank-shaft with perforated wings passes through the fixed top and wire bottom, and is stepped into the bottom, so that the wings revolve vertically in the receiving-chamber, with their lower edges in close proximity to said wire bottom, to effectually stir the coffee, and free it from dust. The fixed top has a covered opening at one side of the crank-shaft, through which the coffee is introduced and removed; and the bottom has a covered opening, through which to shake out the dust which falls through the wire bottom. The crank-shaft is revolved, or vibrated by a detachable link-handle.

In the accompanying drawings, Figure 1 represents a view, in perspective, of my improved coffee-roaster, a portion of the casing being removed to expose the interior, and Fig. 2 a bottom view, to show the covered opening for removing the dust.

The receiver is a vessel, A, with fixed top and bottom, and provided with an annular flange, D, to adapt it for use in the pot-hole of a stove. A wire bottom, C, divides the receiving-chamber near the bottom of the vessel, to form a heat and dust chamber.

A vertical shaft is stepped into the bottom, and passes up through the wire bottom and the fixed top, and is provided with perforated wings B, which revolve in the receiving-chamber with their lower ends in close proximity to the wire bottom, so as to stir the coffee, and cause the dust to pass through the wire bottom. A covered opening is provided in the fixed top at one side of the vertical shaft, through which the coffee is put in and removed from the roaster; and the dust which accumulates in the bottom chamber is shaken out through an opening by moving the slide in the bottom. The agitating-shaft has a crank, and detachable looped handle, by which it is revolved or vibrated, to enable the person to stand away from the heat of the stove in stirring the coffee. The cover for the top opening is hinged; and the vessel has a handle by which to use it.

I claim—

1. The coffee-roaster herein described, consisting of the flanged receiver A D, with fixed top and bottom, and inside wire bottom C, and in which the vertical crank-shaft of perforated wings B is arranged to pass through the fixed top and wire bottom, between which a heat and dust chamber is formed, as herein set forth.

2. The fixed top, provided with the covered opening, and the fixed bottom having the slide-cover, in combination with the inner wire bottom C, and the vertical winged shaft, all constructed for use, as set forth.

GEO. FISHER.

Witnesses:
JAMES WINANS,
THOMAS DUNLAP.